US012312219B2

(12) United States Patent
Zou et al.

(10) Patent No.: US 12,312,219 B2
(45) Date of Patent: May 27, 2025

(54) CONTROL METHOD FOR CONTROLLING RETRACTION OF BOOM, MECHANICAL DEVICE AND STORAGE MEDIUM

(71) Applicant: HUNAN SINOBOOM INTELLIGENT EQUIPMENT CO., LTD., Changsha (CN)

(72) Inventors: Junhui Zou, Changsha (CN); Guoliang Liu, Changsha (CN); Wei Shi, Changsha (CN)

(73) Assignee: HUNAN SINOBOOM INTELLIGENT EQUIPMENT CO., LTD., Changsha (CN)

( * ) Notice: Subject to any disclaimer, the term of this patent is extended or adjusted under 35 U.S.C. 154(b) by 0 days.

(21) Appl. No.: 18/751,759

(22) Filed: Jun. 24, 2024

(65) Prior Publication Data

US 2024/0343530 A1 Oct. 17, 2024

Related U.S. Application Data

(63) Continuation of application No. PCT/CN2022/086492, filed on Apr. 13, 2022.

(30) Foreign Application Priority Data

Jan. 17, 2022 (CN) ......................... 202210048197.0

(51) Int. Cl.
*F15B 11/05* (2006.01)
*B66C 23/00* (2006.01)
*F15B 13/02* (2006.01)

(52) U.S. Cl.
CPC ............ *B66C 23/54* (2013.01); *F15B 11/055* (2013.01); *F15B 13/026* (2013.01); *F15B 2211/253* (2013.01)

(58) Field of Classification Search
CPC . F15B 11/055; F15B 2211/6336; F15B 11/04; F15B 13/02
See application file for complete search history.

(56) References Cited

U.S. PATENT DOCUMENTS 7,712,309 B2 * 5/2010 Vigholm ............... E02F 9/2217 60/419
10,400,802 B2 * 9/2019 Sugano ................... F15B 11/16
2013/0318955 A1 * 12/2013 Zhang ................... E02F 9/2296 60/413
2020/0123737 A1 * 4/2020 Kang ........................ E02F 9/22

* cited by examiner

*Primary Examiner* — Abiy Teka
(74) *Attorney, Agent, or Firm* — Westbridge IP LLC

(57) ABSTRACT

A control method for controlling retraction of a boom is applied to a hydraulic system which combines retraction of the boom by self-weight with retraction of the boom by pressure. The control method includes: when the boom is retracted, controlling the self-weight retraction proportional valve to be at a maximum opening; obtaining an actual speed at which the boom is retracted; controlling a rotation speed of the pressure retraction motor to rise or an opening degree of the pressure retraction proportional valve to increase when the actual speed is less than a preset speed; and controlling the rotation speed of the pressure retraction motor to reduce or the opening degree of the pressure retraction proportional valve to decrease when the actual speed is greater than the preset speed.

17 Claims, 2 Drawing Sheets

CONTROL METHOD FOR CONTROLLING RETRACTION OF BOOM, MECHANICAL DEVICE AND STORAGE MEDIUM

CROSS-REFERENCE TO RELATED APPLICATIONS

The present application is a continuation of International Application No. PCT/CN2022/086492, filed on Apr. 13, 2022, which claims priority to Chinese Patent Application No. 202210048197.0, filed on Jan. 17, 2022. The disclosures of the aforementioned applications are hereby incorporated by reference in their entireties.

TECHNICAL FIELD

The present application relates to the field of electromechanical control technologies, and in particular, to a control method for controlling retraction of a boom, a mechanical device and a storage medium.

BACKGROUND

As is well known, as a kind of device to transport personnels, materials and tools to designated locations for work, an aerial work vehicle has been widely used due to its characteristics such as flexibility, high efficiency and safety.

At present, with increasingly strict laws and regulations on environmental protection, electric drive of an aerial work platform has become a trend. In the control of an electric drive (hybrid) product, a hydraulic pump is driven by a pump motor, to provide dynamic for an action of a vehicle, and the pump motor works to provide dynamic only during the action.

At present, in order to increase working hours, an optimal approach is to reduce a demand of energy consumption for a single action. However, in related technologies, when a boom is retracted, it is not possible to ensure that a speed of retraction of the boom is controllable, so that a demand of energy consumption cannot be reduced.

SUMMARY

The purposes of the present application are to provide a control method for controlling retraction of a boom, a mechanical device and a storage medium, which can ensure that a speed of retraction of a boom is controllable, thus reducing a demand of energy consumption.

In order to achieve the above purposes, the present application provides a control method for controlling retraction of a boom, applied to a hydraulic system which combines retraction of the boom by self-weight with retraction of the boom by pressure, the hydraulic system includes: a pressure retraction motor, a pressure retraction proportional valve and a self-weight retraction proportional valve that are sequentially connected, the boom with non-rod cavity is connected to the self-weight retraction proportional valve, and the boom with rod cavity is connected to the pressure retraction motor and the pressure retraction proportional valve, and the control method includes: when the boom is retracted, controlling the self-weight retraction proportional valve to be at a maximum opening; obtaining an actual speed at which the boom is retracted; controlling a rotation speed of the pressure retraction motor to rise or an opening degree of the pressure retraction proportional valve to increase when the actual speed is less than a preset speed; and controlling the rotation speed of the pressure retraction motor to reduce or the opening degree of the pressure retraction proportional valve to decrease when the actual speed is greater than the preset speed.

Optionally, after the step of controlling a rotation speed of the pressure retraction motor to rise or an opening degree of the pressure retraction proportional valve to increase when the actual speed is less than a preset speed, the control method further includes: determining whether the actual speed is still less than the preset speed, and if the actual speed is still less than the preset speed, controlling the rotation speed of the pressure retraction motor to keep a highest rotation speed or controlling the opening degree of the pressure retraction proportional valve to be a maximum state.

Optionally, after the step of controlling the rotation speed of the pressure retraction motor to reduce or the opening degree of the pressure retraction proportional valve to decrease when the actual speed is greater than the preset speed, the control method further includes: determining whether the actual speed is still greater than the preset speed, and if the actual speed is still greater than the preset speed, controlling the rotation speed of the pressure retraction motor to keep a lowest rotation speed or controlling the opening degree of the pressure retraction proportional valve to be a minimum state.

Optionally, after the step of controlling the rotation speed of the pressure retraction motor to keep a lowest rotation speed or controlling the opening degree of the pressure retraction proportional valve to be a minimum state, the control method further includes: determining whether the actual speed is still greater than the preset speed, and if the actual speed is still greater than the preset speed, controlling an opening degree of the self-weight retraction proportional valve to decrease.

Optionally, the step of controlling an opening degree of the self-weight retraction proportional valve to decrease includes: after delay for a preset time, controlling the opening degree of the self-weight retraction proportional valve to decrease.

Optionally, the step of obtaining an actual speed at which the boom is retracted includes: obtaining a retraction length of the boom within a preset time period; and calculating the actual speed according to the retraction length and the preset time period.

Optionally, before the step of obtaining a retraction length of the boom within a preset time period, the control method further includes: determining whether a length sensor used for obtaining the retraction length of the boom is faulty; if the length sensor is not faulty, executing the step of obtaining an actual speed at which the boom is retracted; and if the length sensor is faulty, controlling the self-weight retraction proportional valve to be at a minimum opening degree, and controlling the rotation speed of the pressure retraction motor to keep a highest rotation speed or the opening degree of the pressure retraction proportional valve to be at a maximum state.

The present application further provides a control system for controlling retraction of a boom, applied to a hydraulic system which combines retraction of the boom by self-weight with retraction of the boom by pressure, the hydraulic system includes: a pressure retraction motor, a pressure retraction proportional valve and a self-weight retraction proportional valve that are sequentially connected, the boom with non-rod cavity is connected to the self-weight retraction proportional valve, the boom with rod cavity is connected to the pressure retraction motor and the pressure retraction proportional valve, and the control system includes: a first control module, configured to control the self-weight retraction proportional valve to be at a maximum opening when the boom is retracted; an obtaining module, configured to obtain an actual speed at which the boom is retracted; a second control module, configured to control a rotation speed of the pressure retraction motor to rise or an opening degree of the pressure retraction proportional valve to increase when the actual speed is less than a preset speed; and a third control module, configured to control the rotation speed of the pressure retraction motor to reduce or the opening degree of the pressure retraction proportional valve to decrease when the actual speed is greater than the preset speed.

The present application further provides a mechanical device, including a memory and a processor, the memory is connected to the processor, a computer program is stored in the memory, and when the computer program in the memory is invoked by the processor, the steps of the control method for controlling the retraction of the boom above-mentioned are implemented.

The present application further provides a non-transitory computer-readable storage medium on which a computer executable instruction is stored, and when the computer executable instruction is loaded and executed by a processor, the steps of the control method for controlling the retraction of the boom above-mentioned are implemented.

Compared with the above-mentioned background technologies, in the control method for controlling the retraction of the boom provided by the present application, when the boom starts to retract, the self-weight retraction proportional valve is controlled to be at the maximum opening, when the actual speed is less than the preset speed, the rotation speed of the pressure retraction motor is controlled to rise or the opening degree of the pressure retraction proportional valve is controlled to increase; and when the actual speed is greater than the preset speed, the rotation speed of the pressure retraction motor is controlled to reduce or the opening degree of the pressure retraction proportional valve is controlled to decrease. According to such a control method above-mentioned, the starting for the retraction of the boom is responded timely, an adjustment is stable and jitter-free, there is no obvious acceleration and deceleration phenomenon, a speed of the retraction of the boom may be adjusted easily and is not affected by an angle of the boom and a length of the boom, and therefore, a reliable speed adjustment may be realized in a full range while reducing energy consumption when the boom is retracted, thus achieving energy conservation and emission reduction. In addition, a speed of retraction by pressure is adjusted first, and then the control of a speed of retraction by self-weight is considered, so as to ensure that the speed is controllable. A way in which the retraction by self-weight and the retraction by pressure work simultaneously is adopted, so that a pressure of the retraction is greatly reduced, which reduces a power demand and electric quantity consumption of a storage battery, further improving endurance time, thus reducing production cost of a vehicle.

The control system for controlling the retraction of the boom, the mechanical device and the storage medium provided by the present application have the above-mentioned beneficial effects, which may not be described herein.

BRIEF DESCRIPTION OF THE DRAWINGS

In order to more clearly explain embodiments of the present application or technical solutions in related technologies, and the drawings needed in the description of the embodiments or the related technologies are briefly introduced below. Apparently, the drawings in the following description are merely for the embodiments of the present application. As for a person with ordinary skill in the field, other drawings may also be obtained according to the provided drawings without creative labor.

DETAILED DESCRIPTION OF THE EMBODIMENTS

In the following, technical solutions in the embodiments of the present application are clearly and completely described with reference to the drawings in the embodiments of the present application. Apparently, the described embodiments are merely a part of the embodiments of the present application, but not all the embodiments. Based on the embodiments in the present application, all other embodiments obtained by a person with ordinary skill in the field without creative labor belong to the protection scope of the present application.

Generally, in related technologies, in order to increase working hours, there are two approaches to be started. An approach is to increase a capacity of a provided battery, and another approach is to reduce required power of an action, that is, to reduce energy consumption. However, if the capacity of a battery increases, a use cost for an end customer may undoubtedly increase, and therefore, an optimal approach is to reduce a demand of energy consumption for a single action.

At present, retraction of a boom mainly adopts a manner of retraction by pressure. Moreover, in order to ensure smooth retraction, a pressure setting value of a balancing valve is generally relatively high, and a pilot ratio of the balancing valve is also relatively small, resulting in a relatively high pressure to open the balancing valve, which increases energy consumption of retraction of a boom, thus shortening battery life, and further reducing available working hours.

In order to make a person skilled in the technical field better understand solutions of the present application, the present application is further described in details in conjunction with the drawings and the specific embodiments.

Figure 1:
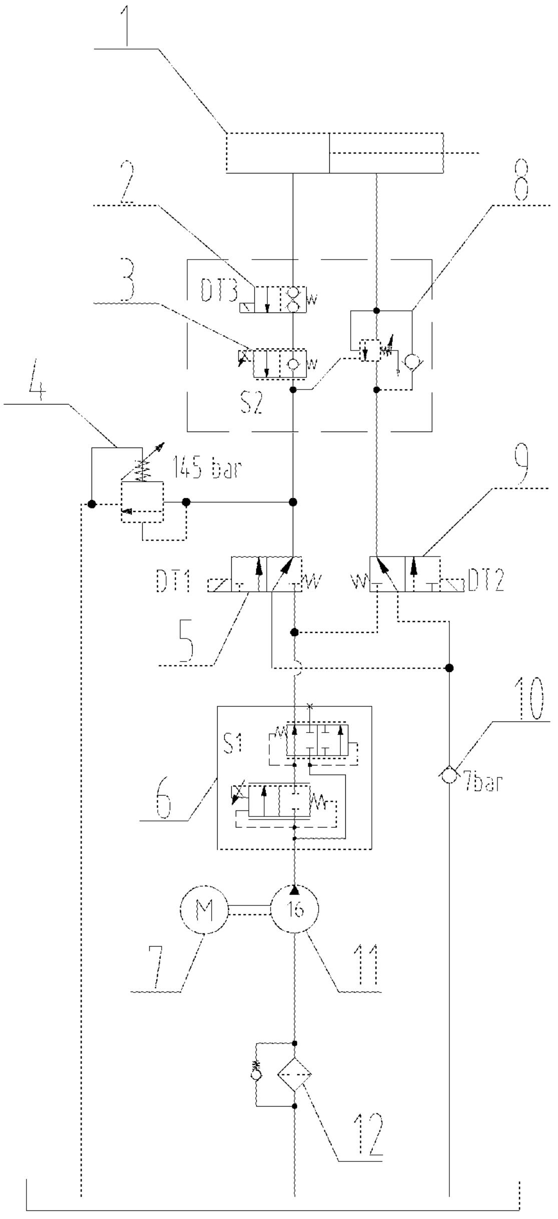
FIG. 1 is a schematic diagram of a hydraulic system applied to a control method for controlling retraction of a boom according to an embodiment of the present application.

The embodiments of the present application provide a control method for controlling retraction of a boom, applied to a hydraulic system which combines retraction of the boom by self-weight with retraction of the boom by pressure. The schematic diagram of the hydraulic system is shown in FIG. 1 of the specification.

The hydraulic system includes: a pressure retraction motor 7, a pressure retraction proportional valve 6 and a self-weight retraction proportional valve 3 that are sequentially connected, the boom 1 with non-rod cavity is connected to the self-weight retraction proportional valve 3, and the boom 1 with rod cavity is connected to the pressure retraction motor 7 and the pressure retraction proportional valve 6.

In addition, a self-weight switch valve 2 may also be connected between the boom 1 with non-rod cavity and the self-weight retraction proportional valve 3, so as to realize on-off of oil in the self-weight retraction proportional valve 3 and the boom 1 with non-rod cavity. The boom 1 with rod cavity is connected to a pilot valve 8 and a pressure switch valve 9, so as to realize on-off of oil between the pressure retraction proportional valve 6 and the pilot valve 8.

An overflow valve 4 and a directional-control valve 5 are also connected between the self-weight retraction proportional valve 3 and the pressure retraction proportional valve 6. When the boom 1 is retracted, i.e., when oil in the boom 1 with non-rod cavity needs to be discharged, the oil in the boom 1 with non-rod cavity flows back to an oil tank through the self-weight switch valve 2, the self-weight retraction proportional valve 3 and the overflow valve 4 in sequence, and after flowing into the self-weight retraction proportional valve 3, the oil in the boom 1 with non-rod cavity may also flow into the directional-control valve 5 and a check valve 10, and finally flows back to the oil tank.

When the boom 1 is retracted, the oil in the oil tank flows into the boom 1 with rod cavity after passing through a valve body 12, a pump body 11, the pressure retraction proportional valve 6, the pressure switch valve 9 and the pilot valve 8 in sequence. In this way, the oil in the boom 1 with non-rod cavity flows out, and the oil in the boom 1 with rod cavity flows in, thus realizing the retraction of the boom 1.

Figure 2:
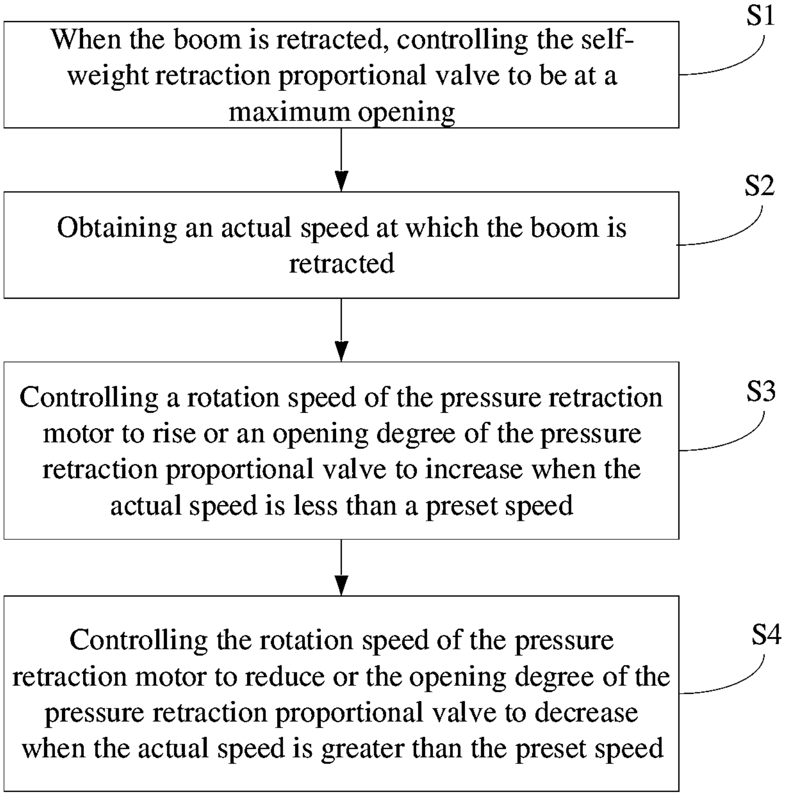
FIG. 2 is a flowchart of a control method for controlling retraction of a boom according to an embodiment of the present application.

Please also refer to FIG. 2, the control method for controlling the retraction of the boom includes:

S1, when the boom is retracted, controlling the self-weight retraction proportional valve 3 to be at a maximum opening;

S2, obtaining an actual speed at which the boom 1 is retracted;

S3, controlling a rotation speed of the pressure retraction motor 7 to rise or an opening degree of the pressure retraction proportional valve 6 to increase when the actual speed is less than a preset speed; and S4, controlling the rotation speed of the pressure retraction motor 7 to reduce or the opening degree of the pressure retraction proportional valve 6 to decrease when the actual speed is greater than the preset speed.

In the step S1, when the boom 1 needs to be retracted, the self-weight retraction proportional valve 3 is controlled to be at the maximum opening. When the retraction of the boom 1 is opened, in order to not only ensure a response speed of initial retraction, but also ensure calculation accuracy of a current speed, so as to reduce large-scale adjustment (for example, ensuring smooth adjustment without jitter phenomenon and obvious acceleration or deceleration phenomenon), an initial opening degree of the pressure retraction proportional valve 6 or an initial rotation speed of the pressure retraction motor 7 cannot be at a maximum value or a relatively low value. According to adjustment and test results, it is relatively appropriate to choose a proportional coefficient between 0.6 and 0.8.

In the step S2, the actual speed at which the boom 1 is retracted is obtained. Specifically, a detection element such as a speed sensor may be used to detect the actual speed at which the boom 1 is retracted.

In addition, the actual speed of the retraction may also be calculated by obtaining a retraction length per unit time, that is:

obtaining a retraction length of the boom 1 within a preset time period; and calculating the actual speed according to the retraction length and the preset time period.

A length sensor may be adopted to detect the retraction length within the preset time period, for example, the retraction length is detected within an interval time ranging from 2 s to 4 s, and the actual speed is calculated by dividing the retraction length by the interval time.

Then, sizes of the actual speed and the preset speed are determined. The preset speed is a speed of retraction that is required and determined during product design, so as to ensure a time requirement of the retraction, and specific data thereof may be determined according to actual requirements.

In the step S3, when the actual speed is less than the preset speed, the rotation speed of the pressure retraction motor 7 is controlled to rise or the opening degree of the pressure retraction proportional valve 6 is controlled to increase.

In the step S4, when the actual speed is greater than the preset speed, the rotation speed of the pressure retraction motor 7 is controlled to reduce or the opening degree of the pressure retraction proportional valve 6 is controlled to decrease.

Herein, the actual speed is compared with the preset speed, and a PID (Proportion Integration Differentiation) adjustment may be performed (for example, when the actual speed is greater than the preset speed, an output value of Output1 is reduced; and when the actual speed is less than the preset speed, the output value of the Output1 is increased), and then an adjustment variable of the Output1 is output, which is used to control the opening degree of the pressure retraction proportional valve 6 or the rotation speed of the pressure retraction motor 7.

For example, assuming that the preset speed is equal to 1 m/s, and the output value of the Output1 is 1200 mA, if the corresponding actual speed at this point is 1.1 m/s, the actual speed is greater than the preset speed, and therefore, the output value of the Output1 should be reduced according to a difference proportion currently generated (for example, reducing to 1100 mA); and if the corresponding actual speed at this point is 0.9 m/s, the actual speed is less than the preset speed, and therefore, the output value of the Output1 should be increased according to a difference proportion currently generated (for example, increasing to 1300 mA). The output value of the Output1 is a request value for directly controlling the pressure retraction proportional valve 6.

It may be seen that, a length at which the boom 1 is retracted is collected in real time, and a length variation amount within the interval time is output, so that the actual speed of the retraction is calculated; and then the actual speed is compared with the preset speed, and the PID adjustment is performed to output adjustment variable data, so as to control the opening degree of the pressure retraction proportional valve 6 or the rotation speed of the pressure retraction motor 7, so that the actual speed of the retraction always follows a predetermined retraction speed, which not only ensures non-overspeed, but also ensures work efficiency.

After the step of controlling a rotation speed of the pressure retraction motor 7 to rise or an opening degree of the pressure retraction proportional valve 6 to increase when the actual speed is less than a preset speed, the control method further includes:

determining whether the actual speed is still less than the preset speed, and if the actual speed is still less than the preset speed, controlling the rotation speed of the pressure retraction motor 7 to keep a highest rotation speed or controlling the opening degree of the pressure retraction proportional valve 6 to be a maximum state.

That is to say, during a control process, the priority is to keep the self-weight retraction proportional valve 3 at a constant maximum opening, and the opening degree of the pressure retraction proportional valve 6 or the rotation speed of the pressure retraction motor 7 are adjusted in the above-mentioned manner, so as to adjust the speed at which the boom 1 is retracted. When the pressure retraction proportional valve 6 is at a predetermined maximum opening and the actual speed is still less than the preset speed, the pressure retraction proportional valve 6 is kept at the predetermined maximum opening.

After the step of controlling the rotation speed of the pressure retraction motor 7 to reduce or the opening degree of the pressure retraction proportional valve 6 to decrease when the actual speed is greater than the preset speed, the control method further includes:

determining whether the actual speed is still greater than the preset speed, and if the actual speed is still greater than the preset speed, controlling the rotation speed of the pressure retraction motor 7 to keep a lowest rotation speed or controlling the opening degree of the pressure retraction proportional valve 6 to be a minimum state.

After the step of controlling the rotation speed of the pressure retraction motor 7 to keep a lowest rotation speed or controlling the opening degree of the pressure retraction proportional valve 6 to be a minimum state, the control method further includes:

determining whether the actual speed is still greater than the preset speed, and if the actual speed is still greater than the preset speed, controlling an opening degree of the self-weight retraction proportional valve 3 to decrease.

That is to say, if the actual speed is greater than the preset speed, the opening degree of the pressure retraction proportional valve 6 or the rotation speed of the pressure retraction motor 7 is reduced, so as to reduce the actual speed.

Further, when the opening degree of the pressure retraction proportional valve 6 or the rotation speed of the pressure retraction motor 7 has been reduced to the minimum, but the actual speed is still greater than the preset speed, the opening degree of the self-weight retraction proportional valve 3 is controlled to reduce after delay for a preset time, and an adjustment variable of Output2 is output, which is used to gradually reduce the opening degree of the self-weight retraction proportional valve 3, so that the actual speed is within a controllable range. The adjustment variable of the Output2 is a request value for actually controlling the opening degree of the self-weight retraction proportional valve 3. The delayed preset time preferably ranges from 1 s to 3 s, which is considered according to actual safety requirements and an effective data acquisition interval of a sensor and the like.

In summary, it may be seen that there are two hydraulic circuits in the retraction manner of the boom: a pressure retraction circuit and a self-weight retraction circuit, which may work independently of each other. During normal control, the speed of the retraction is preferentially controlled by retraction by pressure, and on this basis, if the speed of the retraction cannot be effectively controlled, the opening degree of the self-weight retraction proportional valve 3 starts to reduce, further reducing the speed of the retraction, so that the speed of the retraction is within a range of a design value.

Before the step of obtaining a retraction length of the boom 1 within a preset time period, the control method further includes:

determining whether a length sensor used for obtaining the retraction length of the boom 1 is faulty, if the length sensor is not faulty, executing the step of obtaining an actual speed at which the boom 1 is retracted; and if the length sensor is faulty, controlling the self-weight retraction proportional valve 3 to be at a minimum opening degree, and controlling the rotation speed of the pressure retraction motor 7 to keep a highest rotation speed or the opening degree of the pressure retraction proportional valve 6 to be at a maximum state.

That is to say, when the length sensor reports a fault, in order to ensure retraction safety, a function of the self-weight retraction is turned off, the self-weight retraction proportional valve 3 is controlled to be at the minimum opening degree, functions such as collecting the actual speed are also turned off, and the boom 1 is retracted merely by means of retraction by pressure and in a manner with a maximum flow, i.e., the rotation speed of the pressure retraction motor 7 is controlled to keep the highest rotation speed or the opening degree of the pressure retraction proportional valve 6 is controlled to be the maximum state, so that a risk of speed loss may be reduced, thus shortening time for safe retraction and ensuring operation safety.

Figure 3:
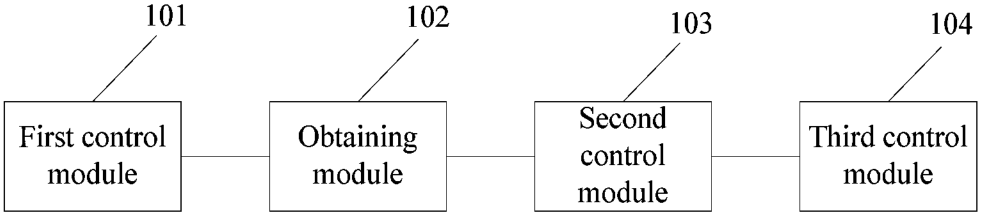
FIG. 3 is a structural block diagram of a control system for controlling retraction of a boom according to an embodiment of the present application.

The present application further provides a control system for controlling retraction of a boom, shown in FIG. 3 in the specification. The control system for controlling the retraction of the boom is applied to a hydraulic system which combines retraction of the boom by self-weight with retraction of the boom by pressure, and the hydraulic system includes: a pressure retraction motor, a pressure retraction proportional valve and a self-weight retraction proportional valve that are sequentially connected, the boom with non-rod cavity is connected to the self-weight retraction proportional valve, the boom with rod cavity is connected to the pressure retraction motor and the pressure retraction proportional valve, the control system for controlling the retraction of the boom is applicable to the control method for controlling the retraction of the boom described above, and the control system includes:

a first control module 101, configured to control the self-weight retraction proportional valve to be at a maximum opening when the boom is retracted;

an obtaining module 102, configured to obtain an actual speed at which the boom is retracted;

a second control module 103, configured to control a rotation speed of the pressure retraction motor to rise or an opening degree of the pressure retraction proportional valve to increase when the actual speed is less than a preset speed; and a third control module 104, configured to control the rotation speed of the pressure retraction motor to reduce or the opening degree of the pressure retraction proportional valve to decrease when the actual speed is greater than the preset speed.

Figure 4:
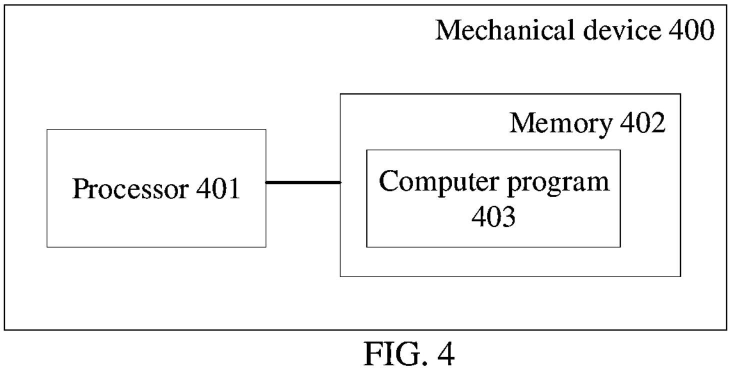
FIG. 4 is a structural block diagram of a mechanical device according to an embodiment of the present application.

The present application further provides a mechanical device, as shown in FIG. 4 in the specification, the mechanical device 400 includes a memory 402 and a processor 401, the memory 402 is connected to the processor 401, a computer program 403 is stored in the memory 402, and when the computer program 403 in the memory 402 is invoked by the processor 401, the steps of the control method for controlling the retraction of the boom above-mentioned are implemented.

The present application further provides a non-transitory computer-readable storage medium on which a computer executable instruction is stored, and when the computer executable instruction is loaded and executed by a processor, the steps of the control method for controlling the retraction of the boom above-mentioned are implemented.

The above provide a detailed introduction to the control method and control system for controlling the retraction of the boom, the mechanical device and the storage medium provided by the present application. In this paper, specific examples are used to explain principles and embodiments of the present application. The description of the above embodiments are merely used to help understand the method and core ideas of the present application. It should be pointed out that, as for a person with ordinary skill in the technical field, without departing from the principles of the present application, several improvements and modifications may be made to the present application, and these improvements and modifications also fall within the protection scope of the claims of the present application.

What is claimed is:

1. A control method for controlling retraction of a boom, applied to a hydraulic system which combines retraction of the boom by self-wight with retraction of the boom by pressure, the hydraulic system comprising: a pressure retraction motor, a pressure retraction proportional valve and a self-weight retraction proportional valve that are sequentially connected, the boom with non-rod cavity being connected to the self-weight retraction proportional valve, and the boom with rod cavity being connected to the pressure retraction motor and the pressure retraction proportional valve, wherein the control method comprises:

when the boom is retracted, controlling the self-weight retraction proportional valve to be at a maximum opening;

obtaining an actual speed at which the boom is retracted;

controlling a rotation speed of the pressure retraction motor to rise or an opening degree of the pressure retraction proportional valve to increase when the actual speed is less than a preset speed, wherein after the step of controlling the rotation speed of the pressure retraction motor to rise or the opening degree of the pressure retraction proportional valve to increase when the actual speed is less than the preset speed, the control method further comprises:

determining whether the actual speed is still less than the preset speed, and if the actual speed is still less than the preset speed, controlling the rotation speed of the pressure retraction motor to keep a highest rotation speed or controlling the opening degree of the pressure retraction proportional valve to be a maximum state; and controlling the rotation speed of the pressure retraction motor to reduce or the opening degree of the pressure retraction proportional valve to decrease when the actual speed is greater than the preset speed.

2. The control method for controlling the retraction of the boom according to claim 1, wherein after the step of controlling the rotation speed of the pressure retraction motor to reduce or the opening degree of the pressure retraction proportional valve to decrease when the actual speed is greater than the preset speed, the control method further comprises:

determining whether the actual speed is still greater than the preset speed, and if the actual speed is still greater than the preset speed, controlling the rotation speed of the pressure retraction motor to keep a lowest rotation speed or controlling the opening degree of the pressure retraction proportional valve to be a minimum state.

3. The control method for controlling the retraction of the boom according to claim 2, wherein after the step of controlling the rotation speed of the pressure retraction motor to keep a lowest rotation speed or controlling the opening degree of the pressure retraction proportional valve to be a minimum state, the control method further comprises:

determining whether the actual speed is still greater than the preset speed, and if the actual speed is still greater than the preset speed, controlling an opening degree of the self-weight retraction proportional valve to decrease.

4. The control method for controlling the retraction of the boom according to claim 3, wherein the step of controlling an opening degree of the self-weight retraction proportional valve to decrease comprises:

after delay for a preset time, controlling the opening degree of the self-weight retraction proportional valve to decrease.

5. The control method for controlling the retraction of the boom according to claim 4, wherein the preset time ranges from 1 s to 3 s.

6. The control method for controlling the retraction of the boom according to claim 1, wherein the step of obtaining an actual speed at which the boom is retracted comprises:

obtaining a retraction length of the boom within a preset time period; and calculating the actual speed according to the retraction length and the preset time period.

7. The control method for controlling the retraction of the boom according to claim 6, wherein before the step of obtaining a retraction length of the boom within a preset time period, the control method further comprises:

determining whether a length sensor used for obtaining the retraction length of the boom is faulty; and if the length sensor is not faulty, executing the step of obtaining an actual speed at which the boom is retracted.

8. The control method for controlling the retraction of the boom according to claim 7, further comprising:

if the length sensor is faulty, controlling the self-weight retraction proportional valve to be at a minimum opening degree, and controlling the rotation speed of the pressure retraction motor to keep a highest rotation speed or the opening degree of the pressure retraction proportional valve to be at a maximum state.

9. A mechanical device, comprising a memory and a processor, wherein the memory is connected to the processor, a computer program is stored in the memory, and when the computer program in the memory is invoked by the processor, a control method for controlling retraction of a boom is implemented, the control method for controlling the retraction of the boom is applied to a hydraulic system which combines retraction of the boom by self-wight with retraction of the boom by pressure, the hydraulic system comprises: a pressure retraction motor, a pressure retraction proportional valve and a self-weight retraction proportional valve that are sequentially connected, the boom with non-rod cavity is connected to the self-weight retraction proportional valve, the boom with rod cavity is connected to the pressure retraction motor and the pressure retraction proportional valve, and the control method comprises:

when the boom is retracted, controlling the self-weight retraction proportional valve to be at a maximum opening;

obtaining an actual speed at which the boom is retracted;

controlling a rotation speed of the pressure retraction motor to rise or an opening degree of the pressure retraction proportional valve to increase when the actual speed is less than a preset speed, wherein after the step of controlling the rotation speed of the pressure retraction motor to rise or the opening degree of the pressure retraction proportional valve to increase when the actual speed is less than the preset speed, the control method further comprises:

determining whether the actual speed is still less than the preset speed, and if the actual speed is still less than the preset speed, controlling the rotation speed of the pressure retraction motor to keep a highest rotation speed or controlling the opening degree of the pressure retraction proportional valve to be a maximum state; and controlling the rotation speed of the pressure retraction motor to reduce or the opening degree of the pressure retraction proportional valve to decrease when the actual speed is greater than the preset speed.

10. The mechanical device according to claim 9, wherein after the step of controlling the rotation speed of the pressure retraction motor to reduce or the opening degree of the pressure retraction proportional valve to decrease when the actual speed is greater than the preset speed, the control method further comprises:

determining whether the actual speed is still greater than the preset speed, and if the actual speed is still greater than the preset speed, controlling the rotation speed of the pressure retraction motor to keep a lowest rotation speed or controlling the opening degree of the pressure retraction proportional valve to be a minimum state.

11. The mechanical device according to claim 10, wherein after the step of controlling the rotation speed of the pressure retraction motor to keep a lowest rotation speed or controlling the opening degree of the pressure retraction proportional valve to be a minimum state, the control method further comprises:

determining whether the actual speed is still greater than the preset speed, and if the actual speed is still greater than the preset speed, controlling an opening degree of the self-weight retraction proportional valve to decrease.

12. The mechanical device according to claim 11, wherein the step of controlling an opening degree of the self-weight retraction proportional valve to decrease comprises:

after delay for a preset time, controlling the opening degree of the self-weight retraction proportional valve to decrease.

13. The mechanical device according to claim 9, wherein the step of obtaining an actual speed at which the boom is retracted comprises:

obtaining a retraction length of the boom within a preset time period; and calculating the actual speed according to the retraction length and the preset time period.

14. The mechanical device according to claim 13, wherein before the step of obtaining a retraction length of the boom within a preset time period, the control method further comprises:

determining whether a length sensor used for obtaining the retraction length of the boom is faulty; and if the length sensor is not faulty, executing the step of obtaining an actual speed at which the boom is retracted.

15. The mechanical device according to claim 14, wherein the control method further comprises:

if the length sensor is faulty, controlling the self-weight retraction proportional valve to be at a minimum opening degree, and controlling the rotation speed of the pressure retraction motor to keep a highest rotation speed or the opening degree of the pressure retraction proportional valve to be at a maximum state.

16. A non-transitory computer-readable storage medium on which a computer executable instruction is stored, wherein when the computer executable instruction is loaded and executed by a processor, a control method for controlling retraction of a boom is implemented, the control method for controlling the retraction of the boom is applied to a hydraulic system which combines retraction of the boom by self-wight with retraction of the boom by pressure, the hydraulic system comprises: a pressure retraction motor, a pressure retraction proportional valve and a self-weight retraction proportional valve that are sequentially connected, the boom with non-rod cavity is connected to the self-weight retraction proportional valve, the boom with rod cavity is connected to the pressure retraction motor and the pressure retraction proportional valve, and the control method comprises:

when the boom is retracted, controlling the self-weight retraction proportional valve to be at a maximum opening;

obtaining an actual speed at which the boom is retracted;

controlling a rotation speed of the pressure retraction motor to rise or an opening degree of the pressure retraction proportional valve to increase when the actual speed is less than a preset speed, wherein after the step of controlling the rotation speed of the pressure retraction motor to rise or the opening degree of the pressure retraction proportional valve to increase when the actual speed is less than the preset speed, the control method further comprises:

determining whether the actual speed is still less than the preset speed, and if the actual speed is still less than the preset speed, controlling the rotation speed of the pressure retraction motor to keep a highest rotation speed or controlling the opening degree of the pressure retraction proportional valve to be a maximum state; and controlling the rotation speed of the pressure retraction motor to reduce or the opening degree of the pressure retraction proportional valve to decrease when the actual speed is greater than the preset speed.

17. The non-transitory computer-readable storage medium according to claim 16, wherein after the step of controlling the rotation speed of the pressure retraction motor to reduce or the opening degree of the pressure retraction proportional valve to decrease when the actual speed is greater than the preset speed, the control method further comprises:

determining whether the actual speed is still greater than the preset speed, and if the actual speed is still greater than the preset speed, controlling the rotation speed of the pressure retraction motor to keep a lowest rotation speed or controlling the opening degree of the pressure retraction proportional valve to be a minimum state.

* * * * *